United States Patent [19]

Paoli

[11] Patent Number: 5,343,224
[45] Date of Patent: Aug. 30, 1994

[54] DIODE LASER MULTIPLE OUTPUT SCANNING SYSTEM

[75] Inventor: Thomas L. Paoli, Los Altos, Calif.
[73] Assignee: Xerox Corporation, Stamford, Conn.
[21] Appl. No.: 948,531
[22] Filed: Sep. 22, 1992
[51] Int. Cl.$^5$ .............................. B41J 2/435
[52] U.S. Cl. .................... 346/108; 359/487
[58] Field of Search ............... 346/1.1, 76 L, 107 R, 346/108, 160; 359/485, 487, 495, 496

[56] References Cited

U.S. PATENT DOCUMENTS

| | | | |
|---|---|---|---|
| 4,424,442 | 1/1984 | Kitamura | 250/236 |
| 4,445,125 | 4/1984 | Scifres et al. | 346/108 |
| 4,474,422 | 10/1984 | Kitamura | 350/6.8 |
| 4,591,903 | 5/1986 | Kawamura et al. | 358/75 |
| 4,637,679 | 1/1987 | Funato | 350/6.5 |
| 4,847,642 | 7/1989 | Murayama et al. | 346/157 |
| 4,873,541 | 10/1989 | Hirose et al. | 346/160.1 |
| 4,903,067 | 2/1990 | Murayama et al. | 346/160 |
| 4,938,593 | 7/1990 | Morris et al. | 356/344 |
| 4,962,312 | 10/1990 | Matuura et al. | 250/236 |
| 5,260,565 | 11/1993 | Rose et al. | 250/227.15 |
| 5,272,496 | 12/1993 | Nicolas et al. | 353/34 |

OTHER PUBLICATIONS

W. T. Tsang entitled "CW Multiwavelength Traverse-Junction-Stripe Lasers Grown by Molecular Beam Epitaxy Operating Predominantly in Single-Longitudinal Modes", pp. 441–443 of vol. 36, No. 6, of Applied Physics Letter, 15 Mar. 1980.

Okuda et al. entitled "Simultaneous CW Operation of 5-Wavelength Integrated Gain AsP/InP DFB Laser Array with 50 Å Lasing Wavelength Separation," pp. L904–L906, vol. 23, No. 12 of the Japanese Journal of Applied Physics, Dec. 1984.

Primary Examiner—Mark J. Reinhart
Attorney, Agent, or Firm—John M. Kelly

[57] ABSTRACT

Multiple beam output scanning is obtained from a single raster scanning system (ROS) with a rotating mirror, beneficially a polygon mirror, and a single set of scan optics for use in single or multiple station printers. A plurality of coaxially overlapping laser beams from the same spatial location, but of dissimilar polarization states and wavelengths, are deflected using a common mirror surface area and are subsequently separated by a plurality of optical polarized beam separators and optical dichroic beam separators. The separated laser beams are directed onto associated photoreceptors such that their optical path lengths from the source location to their respective photoreceptors are substantially the same.

90 Claims, 7 Drawing Sheets

DIODE LASER MULTIPLE OUTPUT SCANNING SYSTEM

CROSS-REFERENCES

The present application relates to U.S. Pat. 5,243,359, entitled "Raster Output Scanner for a Multistation Printing System," issued Sept. 7 1993 to Fisli; and to U.S. patent applications: "Multi-Beam, Orthogonally-Polarized Emitting Monolithic Quantum Well Lasers," Ser. No. 07/948,524, filed Sept. 22, 1992 by Treat et al.; "Polarization Switchable Quantum Well Laser," Ser. No. 07/948,522, filed Sept. 22, 1992 by Bour et al.; and "Raster Output Scanner for a Single Pass Printing System which Separates Plural Laser Beams by Wavelength and Polarization," Ser. No. 07/948,530, filed Sept. 22, 1992 by Appel et al. The cross-referenced United States patent and the cross-referenced U.S. patent applications are all assigned to the assignee hereof, and are all hereby incorporated by reference.

BACKGROUND OF THE PRESENT INVENTION

In xerographic printing (also called electrophotographic printing), a latent image is formed on a charged photoreceptor, usually by raster sweeping a modulated laser beam across the photoreceptor. The latent image is then used to create a permanent image by transferring and fusing toner that was electrostatically attracted to the latent image onto a recording medium, usually plain paper.

While xerographic printing has been successful, problems arise when attempting to print at very high speed. One set of problems relates to the sweeping of the laser beam across the photoreceptor. As printing speed increases, it becomes more and more difficult to sweep the laser beam as fast as is required. While other sweeping methods are known, the most common method is to deflect the laser beam from a rotating mirror. Thus one way of increasing the sweep speed is to rotate the mirror faster. While this helps, extremely fast mirror rotation requires an expensive drive motor and bearings and an increasingly more powerful laser.

Other techniques of increasing the raster sweep speed are 1) to sweep the laser beam using a multifaceted, rotating polygon mirror (and a related set of optics), and/or 2) to sweep several laser beams simultaneously. Rotating polygon mirrors and related optics are so common that they are generically referred to as ROSs (Raster Output Scanners). Printers that sweep several beams simultaneously are referred to as multiple beam printers.

The raster sweep rate problem becomes even more apparent when printing in color at high speed. This is because a color xerographic printer requires a separate image for each color printed, hereinafter called a system color. While a dual color printer requires only two images, a full color printer typically requires four images, one for each of the three primary colors of cyan, magenta, yellow, and an additional one for black. Color prints are currently produced by sequentially transferring and fusing overlapped system colors onto a single recording medium which is passed multiple times, once for each system color, through the printer. Such printers are referred to as multiple pass printers. Conceptually, one can imprint multiple colors on a recording medium in one pass through the system by using a sequence of xerographic stations, one for each system color. If each station is associated with a separate photoreceptor, the printer is referred to as a multistation printer; if the stations use different positions on the same photoreceptor, the printer is referred to as a single station/multiposition printer. Multistation and single station/multiposition printers have greater printed page output than a multipass printer operating at the same raster sweep speed. However, the commercial introduction of multistation and single station/multiposition printers has been delayed by 1) cost problems, at least partially related to the cost of multiple xerographic elements and the associated ROSs, and 2) image quality problems, at least partially related to the difficulty of producing spots on each photoreceptor and then subsequently registering (overlapping) the images on the photoreceptor(s).

Proposed prior art multistation printers usually use individual ROSs (each comprised of separate polygon mirrors, lenses, and related optical components) for each station. For example, U.S. Pat. 4,847,642 to Murayama et al. involves such a system. Problems with such systems include the high cost of producing nearly identical multiple ROSs and the difficulty of registering the system colors.

A partial solution to the problems of multistation xerographic systems with individual ROSs is disclosed in U.S. Pat. No. 4,591,903 to Kawamura et al. That patent, particularly with regards to FIG. 6, discusses a recording apparatus (printer) having multiple recording stations and multiple lens systems, but only one rotating polygon mirror. Thus, the cost of the system is relatively low. However, differences in the lenses and mirror surfaces could still cause problems with accurate registration of different latent images.

Another approach to overcoming the problems of multistation printers having individual ROSs is disclosed in U.S. Pat. 4,962,312 to Matuura, et al. That patent illustrates spatially overlapping a plurality of beams using an optical beam combiner, deflecting the overlapped beams using a single polygon mirror, separating the deflected beams using an optical filter (and polarizers if more than two beams are used), and directing the separated beams onto associated photoreceptors. The advantage of overlapping the laser beams is a significant cost reduction since the ROS is shared. It is believed that a commercial embodiment of the apparatus disclosed in U.S. Pat. 4,962,312 would be rather complicated and expensive, especially if four system colors are to be printed. The use of optical beam combiners to overlap beams so that they have similar optical axes and similar sized spots is thought to be difficult, expensive, and time consuming.

One solution to the problems with the teachings of U.S. Pat. 4,962,312 is disclosed in "RASTER OUTPUT SCANNER FOR A MULTISTATION XEROGRAPHIC PRINTING SYSTEM," U.S. Pat. No 5,243,339 issued Sept. 7, 1993 to Fisli. That patent provides a raster output scanning system employing a rotating polygon mirror that simultaneously deflects a plurality of clustered, dissimilar wavelength laser beams having common optical axes and substantially common origins from common mirror surface areas. The clustered beams are subsequently separated by a plurality of optical filters and are then directed onto associated photoreceptors of a multistation printer. However, economically feasible optical filters require the dissimilar beams to be separated by a sufficiently large wavelength. Typically a wavelength difference of about 50 nm is required. For example, U.S. Pat. No. 5,243,359 utilizes lasers emitting at 645, 695, 755, and 825 nm. Since laser emission from closely spaced laser sources over this wavelength span is not yet available using one semiconductor material, practical systems need to integrate two distinctly different material systems, such as AlGaAs and AlGaInP. Additionally, the wide wavelength span necessitates that the photoreceptive surface(s) has adequate response over that span, which will include the infrared portions of the optical spectrum. However, few photoreceptive surfaces respond well in the infrared.

Accordingly, there is a need for apparatus and methods to simultaneously deflect and subsequently separate multiple, nearly coaxial laser beams emitted from closely spaced lasers having minimally different optical wavelengths. The apparatus and method should produce similarly dimensioned spots that are readily brought into registration.

SUMMARY OF THE INVENTION

The present invention provides a raster output scanning (ROS) apparatus which simultaneously sweeps a plurality of orthogonally polarized and dissimilar wavelength laser beams having common optical axes from common mirror surface areas. The swept laser beams are subsequently separated by a combination of a polarized beam separator and a dichroic beam separator. The separated laser beams are subsequently directed onto associated photoreceptive regions of a single station/multiposition printer, or onto associated photoreceptors of a multistation printer. Similarly dimensioned and registered spots are readily obtained on all photoreceptive regions, beneficially by establishing a substantially similar optical path length for each laser beam.

The inventive apparatus can be implemented in several ways. For example, in one embodiment, a first polarized beam separator separates at least a first polarized beam from the swept beams and directs the remaining similarly polarized, but dissimilar wavelength laser beams into an optical wavelength filter. The optical wavelength filter separates a second beam from a third beam. If the first, second, or third beams are coaxial with other laser beams, additional optical wavelength filters may then be used to fully separate the laser beams. An alternative embodiment first separates the laser beams on the basis of wavelength and then separates on the basis of polarization. Of course, additional laser beams and beam separation sections, either based on polarization or wavelength, may be included. Specifically, four laser beam systems are useful in implementing color printing systems. The embodiments beneficially include devices, such as mirrors, to set each laser beam's optical path length the same.

It is an aim of this invention to utilize cross-polarized optical beams to reduce the number of distinctly different wavelengths required to obtain spatially separated optical beams from a multiple beam scanning apparatus which simultaneously deflects multiple coaxially overlapping optical beams.

BRIEF DESCRIPTION OF THE DRAWINGS

In general, like reference numerals denote like elements in each of the aforementioned figures.

DETAILED DESCRIPTION OF THE ILLUSTRATED EMBODIMENTS

Figure 1:
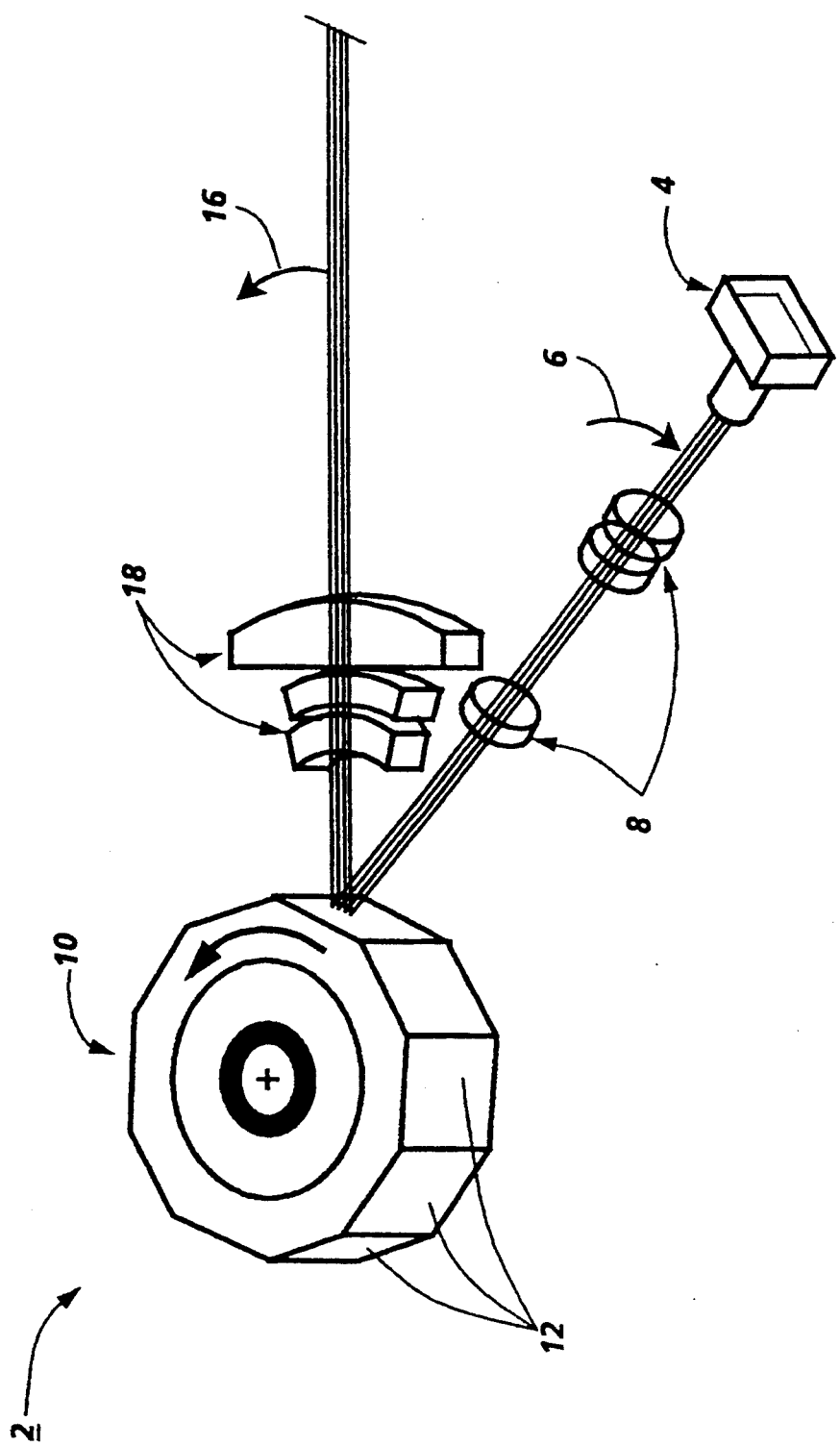
FIG. 1 shows a simplified perspective and schematic view of a raster output scanner (ROS) used in the various illustrated embodiments of the present invention.

A perspective, schematic view of a basic raster output scanner 2 as used in the illustrated embodiments of the present invention is described with reference to FIG. 1. Raster output scanner 2 includes a laser source 4 that outputs multiple laser beams 6 (four beams shown in FIG. 1) from a substantially common spatial location. For purposes of clarity, only the chief rays are shown. Each beam is independently modulated with data appropriate to expose a photoreceptive element in accordance with a desired image. An input optical system 8 serves to direct laser beams 6 onto overlapping coaxial optical paths such that they illuminate a rotating polygon 10 having a plurality of facets 12. The rotating polygon 10 repeatedly and simultaneously deflects the laser beams in the direction indicated by the arrow 16. The deflected laser beams are input to a single set of imaging and correction optics 18, which focus the laser beams and correct for errors such as polygon angle error and wobble.

Figure 2:
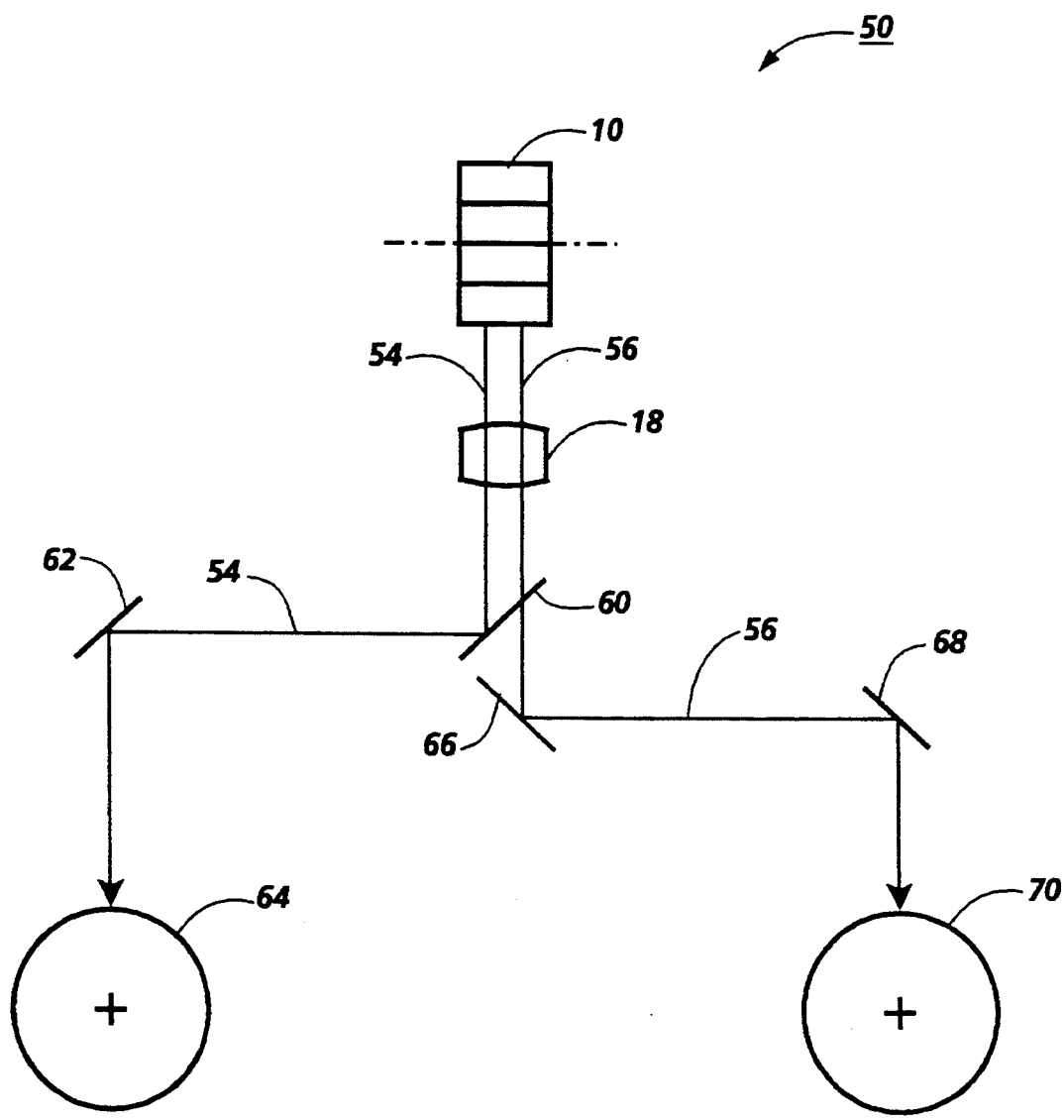
FIG. 2 shows a simplified schematic view of a dual laser beam raster output scanning (ROS) apparatus according to a first embodiment of the present invention.

The raster output scanner 2 (not all components shown in FIG. 2) is used in a first embodiment apparatus 50 as illustrated in FIG. 2. In this embodiment, the raster output scanner 2 outputs two laser beams (instead of four as shown in FIG. 1), designated 54 and 56. In the illustrated embodiment, those beams have substantially the same optical wavelength, but are linearly polarized in orthogonal directions in the plane perpendicular to their propagation direction. Again, only the chief rays are shown. A polarized beam separator 60 separates the laser beams 54 and 56 after they pass through correction optics 18. The beam separator 60 is a polarization selective, multiple layer film, having the optical characteristics shown in FIG. 3. Details of the beam separator 60 are subsequently described in more detail. A mirror 62 reflects the separated laser beam 54 onto a photoreceptor 64, while mirrors 66 and 68 reflect laser beam 56 onto a photoreceptor 70.

The apparatus 50 may be used for two color printing where the image created on each photoreceptor corresponds to a different system color. The optical components 60, 62, 66, and 68 are oriented so that the optical path lengths from the laser source 4 (not shown) to the photoreceptors 64 and 70 are substantially equal. To reduce the problems associated with coaxially aligning the beams, obtaining equal optical path lengths, and registering the laser spots on different photoreceptors, the dual laser beam apparatus of FIG. 2 uses a laser device 4 (not shown in FIG. 2) that generates coaxially overlapping, cross-polarized laser beams. The laser device 4 may be either a monolithic diode laser array or two nonmonolithic diode lasers closely spaced in a single integrated package. Orthogonality of the linearly polarized beams may be established either by the relative orientation of the two laser chips within the package, or by the relative orientation of the linearly polarized beams emitted by a monolithic laser array, as disclosed in concurrently filed "MULTI-BEAM, ORTHOGONALLY-POLARIZED EMITTING MONOLITHIC QUANTUM WELL LASERS," Ser. No. 07/948,524, filed Sept. 22, 1992 by Treat et al, and "POLARIZATION SWITCHABLE QUANTUM WELL LASER," Ser. No. 07/948,522, filed Sept. 22, 1992 by Bour et al. With either type of source, laser device 4 provides a substantially common spatial origin for both laser beams.

Figure 3:
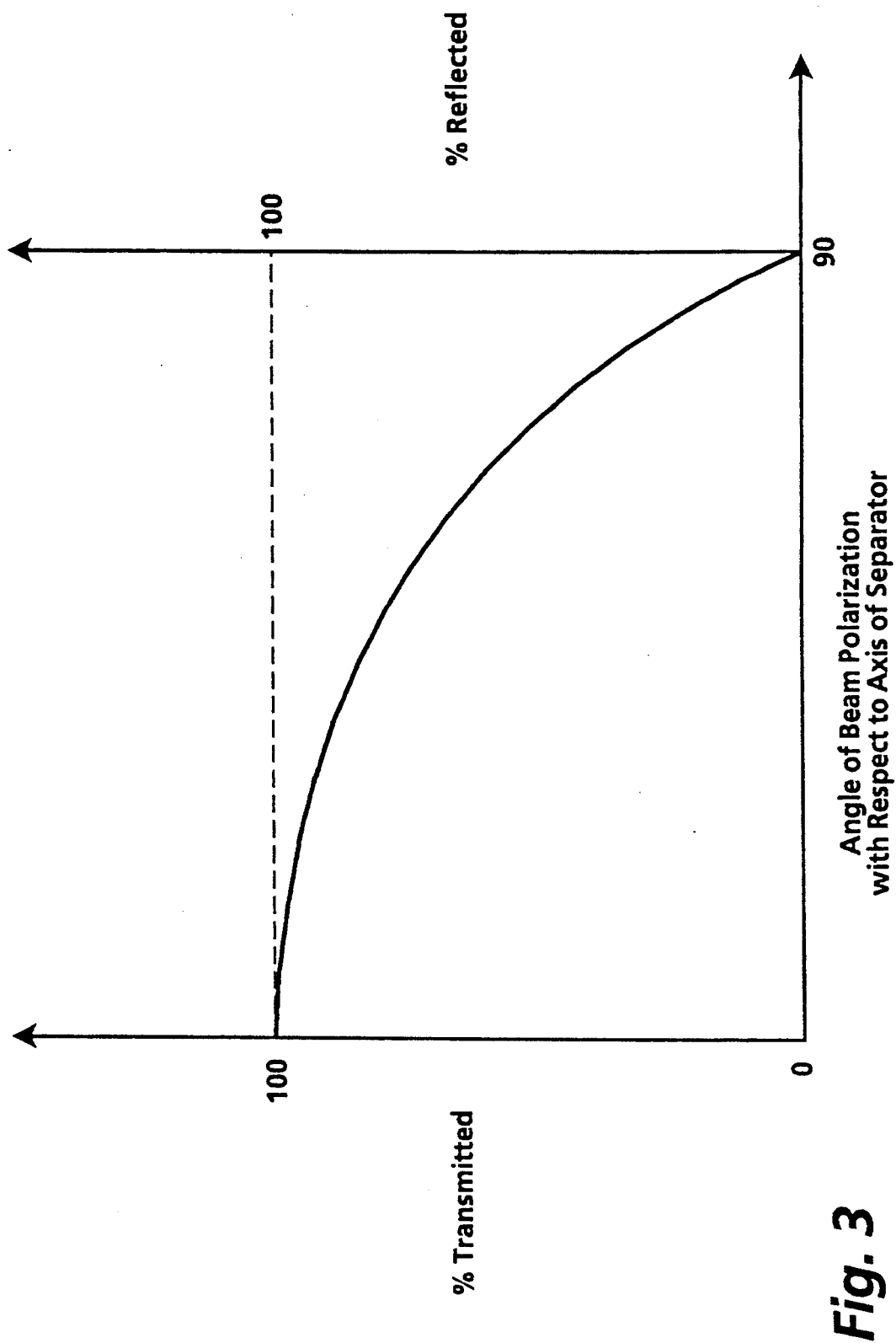
FIG. 3 shows the reflection/transmission characteristics of a polarized beam separator (as used in various embodiments of the present invention)

As previously mentioned, the polarized beam separator 60 has optical transmission/reflection characteristics as shown in FIG. 3. The laser beam 56 is aligned to be linearly polarized at 0° with respect to the axis of the polarized beam separator 60, while coaxial laser beam 54 is linearly polarized at 90° with respect to the axis of the polarized beam separator. Therefore, laser beam 56 passes through the polarized beam separator 60, while laser beam 54 is reflected at nominally 45° with respect to the direction of propagation of laser beams. Polarized beam separators are well known to those in the applicable arts. Reference may be made to Vol 10 of Applied Optics and Optical Engineering, edited by R. R. Shannon and J. C. Wyant, CHAPTER 10, PP 51–52.

Since the apparatus illustrated in FIG. 2 simultaneously forms, sweeps, and deflects two laser beams, and since both laser beams are from substantially the same spatial location and have substantially parallel optical axes, similarly dimensioned beams are input to the polarized beam separator 60. Thus the problem of maintaining equal optical path length for each beam reduces to the much simpler problem of maintaining substantially equal optical path lengths from the polarized beam separator 60 to the photoreceptors 64 and 70. Substantially equal optical path lengths are set by properly positioning mirrors 62, 66, and 68. Equalization of optical path lengths results in similarly dimensioned spots at each photoreceptor. Additionally, the problem of registration is reduced since the characteristics of the mirror surface area and the related optics which respectively sweep and form both beams are common to both beams. Furthermore, since both beams are nominally at the same wavelength, the beam forming optics do not have to be designed to simultaneously focus two wavelengths at the same distance.

Figure 4:
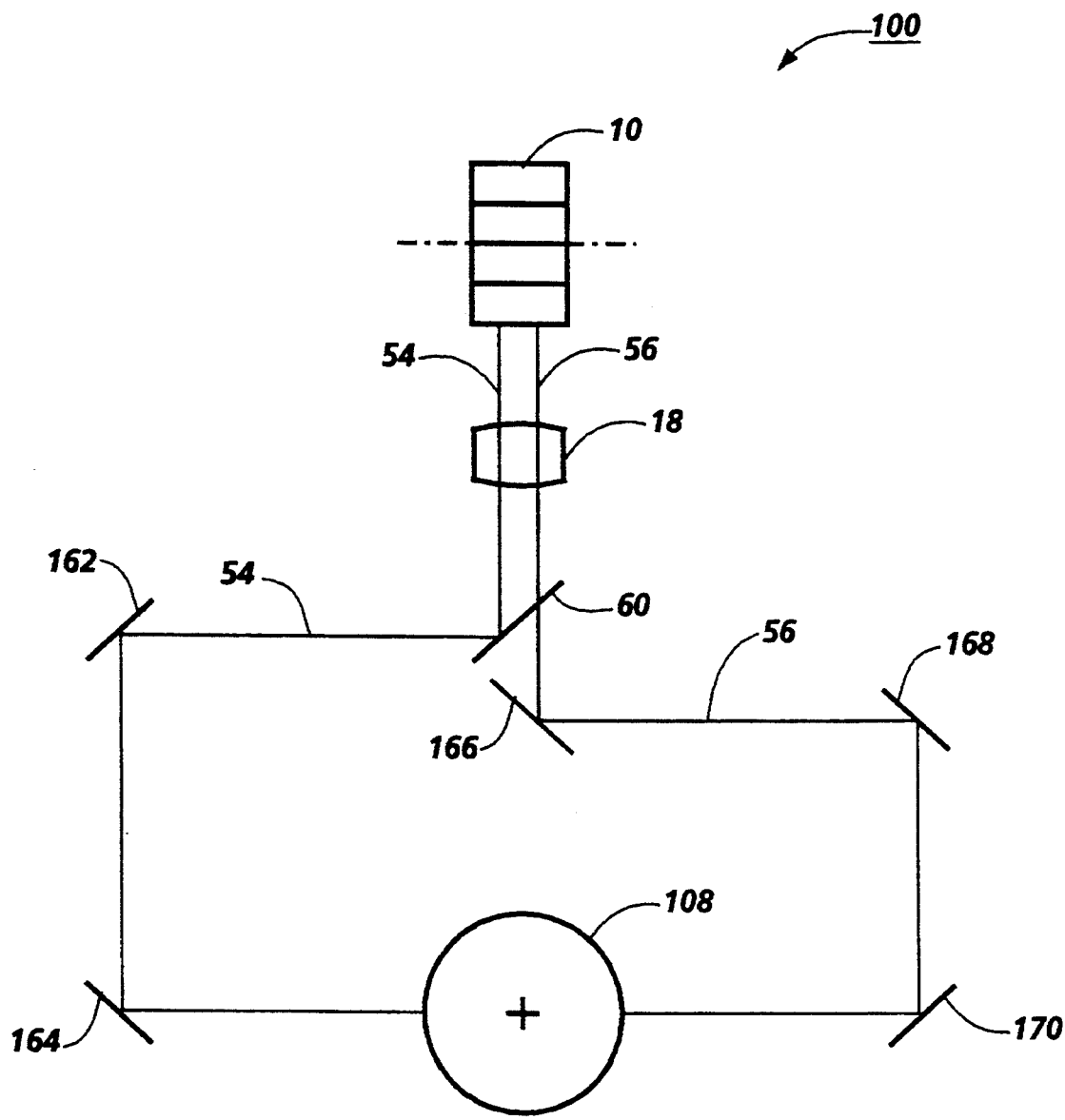
FIG. 4 s a simplified schematic view of a dual laser beam raster output scanning apparatus according to a second embodiment of the present invention.

FIG. 4 shows a simplified schematic view of a second embodiment apparatus 100. Apparatus 100 is a single station/multiposition printer using the raster output scanner 2, including polygon 10 and optics 18, to simultaneously deflect two laser beams (instead of four as shown in FIG. 1) across spatially separated regions of one moving photoreceptor 108. As with apparatus 50, each laser beam has nominally the same optical wavelength but is orthogonally polarized with respect to the other. A polarized beam separator 60 separates the laser beams after they pass through the correction optics 18. In apparatus 100, mirrors 162 and 164 serve to direct the deflected laser beam 54 onto photoreceptor 108, while mirrors 166, 168 and 170 serve to direct laser beam 56 onto a separate region of photoreceptor 108. By incorporating a means for transferring each image to paper, a two color xerographic print engine may be produced. Although details of the structure and operation of such means are beyond the scope of the present disclosure, they are well known to those skilled in the art. Nevertheless, it is evident that utilization of the present invention in conjunction with a single photoreceptive drum or belt provides advantages similar to those described in conjunction with two separate xerographic stations.

Figure 5:
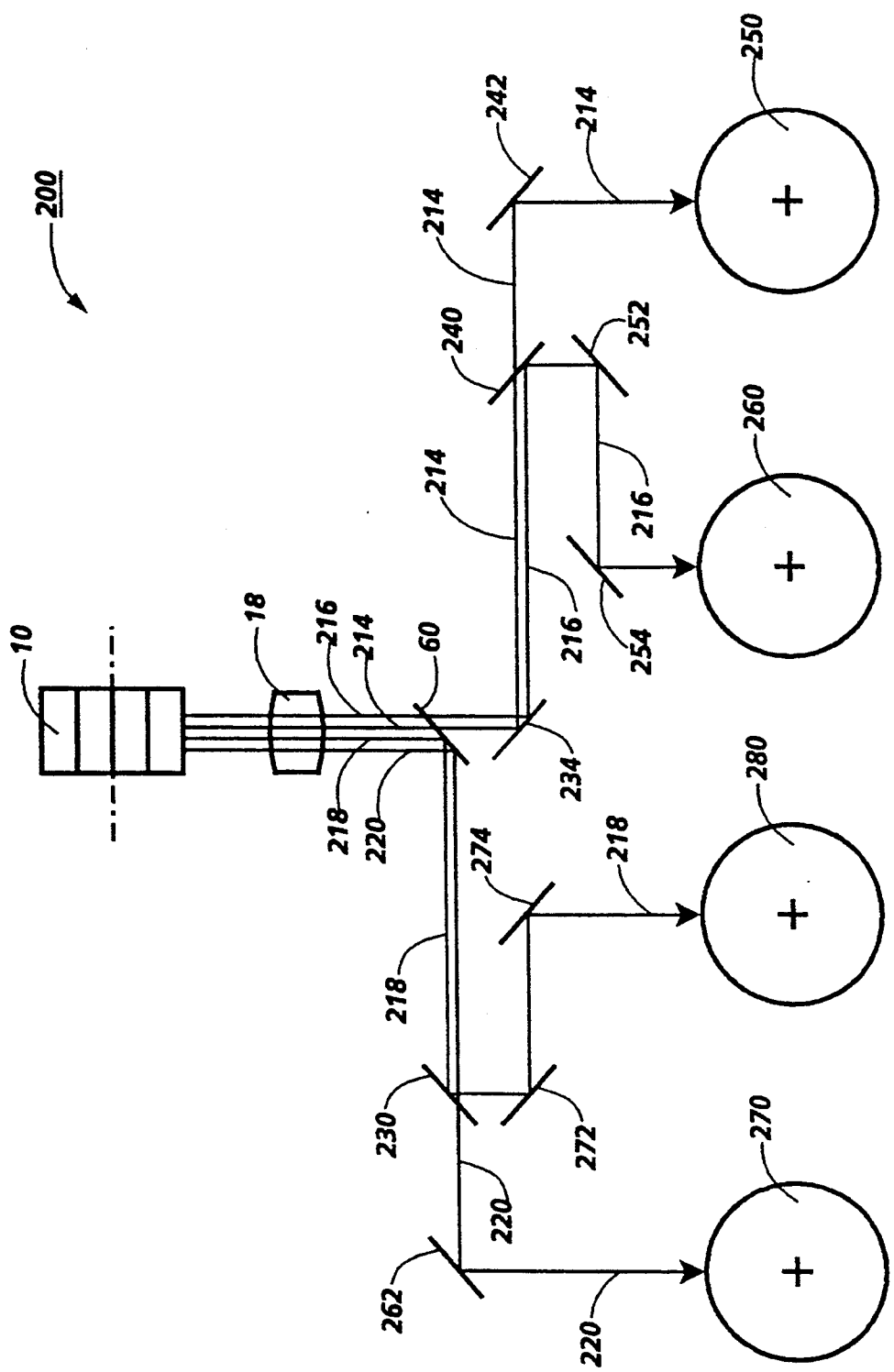
FIG. 5 shows a simplified schematic view of a four laser beam raster output scanner (ROS) apparatus according to third embodiment of the present invention.

FIG. 5 shows a simplified, schematic view of a third embodiment apparatus 200 in which four laser beams, designated laser beams 214, 216, 218, and 220, are simultaneously scanned across four moving photoreceptors. Again, only the chief rays are shown. The apparatus 200, a multiple station printer, uses the raster output scanner 2, including polygon 10 and optics 18 and laser device 4, to produce the four laser beams (not all components of the raster output scanner 2 are shown in FIG. 5). The laser beams are input to a polarized beam separator 60 (whose characteristics are discussed above and whose use is discussed below). Two of the beams, i.e. laser beams 216 and 218, nominally have the same wavelength, for example 650 nm, but are linearly polarized at 90° with respect to the axis of the polarized beam separator 60. The other two laser beams, i.e. laser beams 214 and 220, nominally have the same wavelength, for example 600 nm, which differs from the wavelength of laser beams 216 and 218. Laser beams 214 and 216 are aligned to be linearly polarized at 0° with respect to the axis of a polarized beam separator 60.

Since the polarized beam separator 60 has the optical transmission/reflection characteristics shown in FIG. 3, polarized beam separator 60 separates the overlapping laser beams 214 and 216 from laser beams 218 and 220. Laser beams 218 and 220 are input into a dichroic beam separator 230, while laser beams 214 and 216 first reflect off of a mirror 234 and are then input into a dichroic beam separator 240. The dichroic beam separators 230 and 240 are wavelength selective multiple layer films having optical characteristics similar to those shown in FIG. 6 (discussed below). Thus, the dichroic beam separator 230 separates the overlapping beams 218 and 220, while the dichroic beam separator 240 separates the overlapping beams 214 and 216. A mirror 242 then reflects the separated laser beam 214 onto a photoreceptor 250, while mirrors 252 and 254 reflect the separated laser beam 216 onto a photoreceptor 260. Similarly, a mirror 262 reflects the separated laser beam 220 onto a photoreceptor 270, while mirrors 272 and 274 reflect the separated laser beam 218 onto a photoreceptor 280. Since each laser beam is independently modulated with image information, a distinct latent image is simultaneously printed on each photoreceptor. Thus apparatus 200 may be used for full color reproduction, wherein the image on each photoreceptor corresponds to a different system color.

The apparatus of FIG. 5 uses a laser device 4 (shown in FIG. 1) that generates four coaxially overlapping, cross-polarized laser beams of two dissimilar wavelengths using either a monolithic diode laser array or four nonmonolithic diode lasers closely spaced in a single integrated package. The use of two wavelengths (instead of four as in U.S. Pat. No. 5,243,359) considerably simplifies the construction of the laser device and the requirements placed on the photoreceptive elements. Orthogonality of the linearly polarized beams is established either by the relative orientation of the laser chips within a single integrated package, or by the relative orientation of the linearly polarized beams emitted by a monolithic laser array, as disclosed previously, "MULTI-BEAM, ORTHOGONALLY-POLARIZED EMITTING MONOLITHIC QUANTUM WELL LASERS," Ser. No. 07/948,524, filed Sept. 22, 1992 by Treat et al, and "POLARIZATION SWITCHABLE QUANTUM WELL LASER," Ser. No. 07/948,522, filed Sept. 22, 1992 by Bour et al. With either type of source, laser device 4 effectively provides a substantially common spatial origin for both laser beams.

Figure 6:
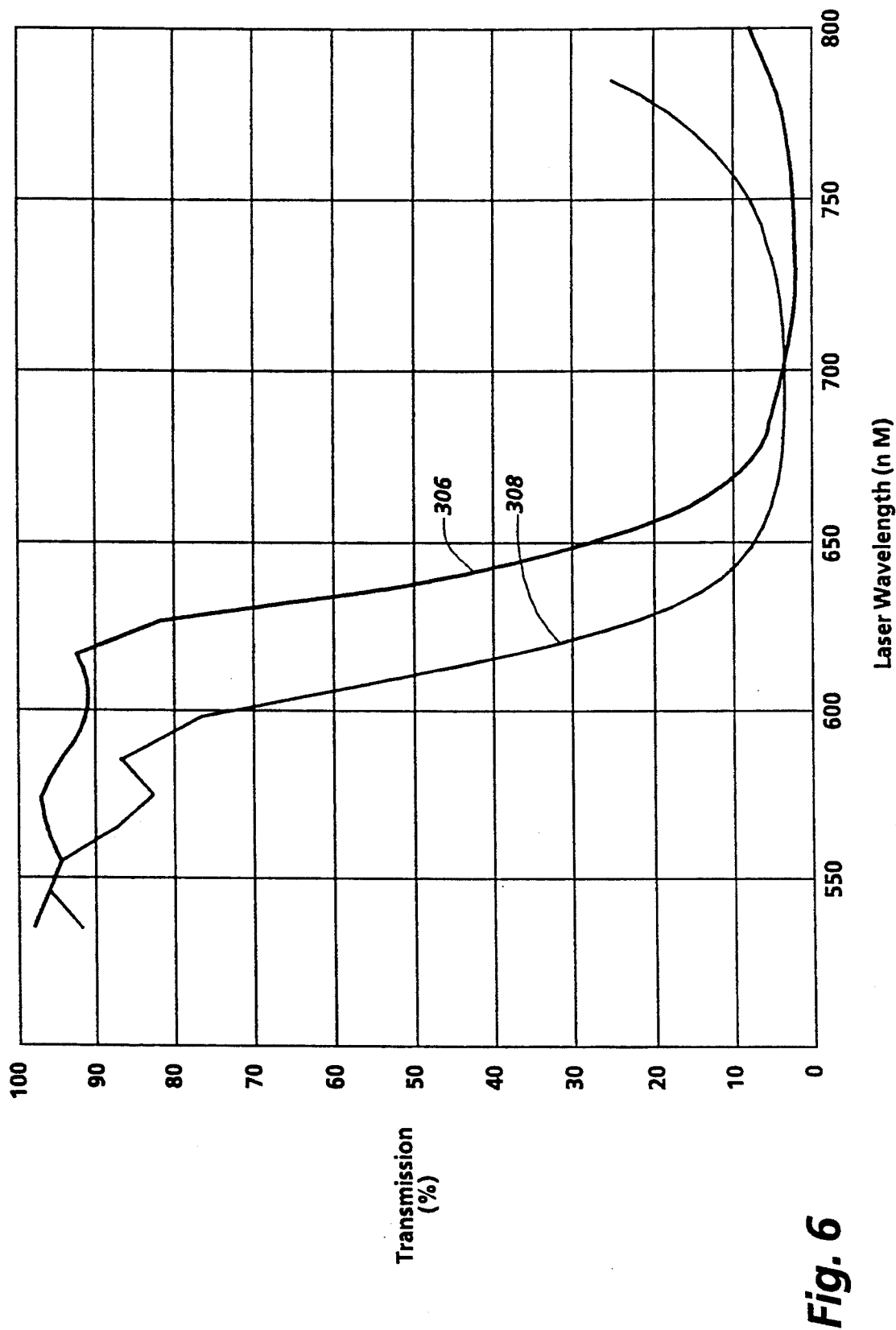
FIG. 6 shows the reflection/transmission characteristics of a dichroic beam separator (as used in various embodiments of the present invention)

As mentioned, the dichroic beam separators 230 and 240 have the transmission/reflection characteristics shown in FIG. 6 In FIG. 6, the curve 306 represents the characteristics of the optical filter when light strikes at a 45° angle of incidence, while curve 308 represents the filter's characteristics when light strikes at a 60° angle of incidence. Thus for two wavelengths appropriately matched to the optical characteristics, e.g. 600 nanometers and 650 nanometers, changes in the transmission/reflection characteristics of the dichroic beam separators as the laser beams are scanned through angles as large as 15° have inconsequential effects on the apparatus performance. Such dichroic mirrors are well known in the art. Reference may be had to Volume 1 of "Applied Optics and Optical Engineering," (1965) edited by R. Kingslake, in several places, including chapter 5, number IV and chapter 8, numbers VIII and IX.

Since the system illustrated in FIG. 5 simultaneously forms, sweeps, and corrects each beam, and since all beams are from substantially the same spatial location and have substantially parallel optical axes, similarly dimensioned beams are input to the polarized beam separator 60. Thus the problem of maintaining equal optical path lengths for each beam reduces to the much simpler problem of maintaining substantially equal optical path lengths from the polarized beam separator 60 to the individual photoreceptors. Substantially equal optical path lengths are set by adjusting the individual optical path lengths by properly positioning mirrors 234, 242, 252, 254, 262, 272, and 274. Additionally, the problem of registration is reduced since the characteristics of the mirror surface area and related optics which sweep and form the beams are simultaneously shared by all of the beams.

Figure 7:
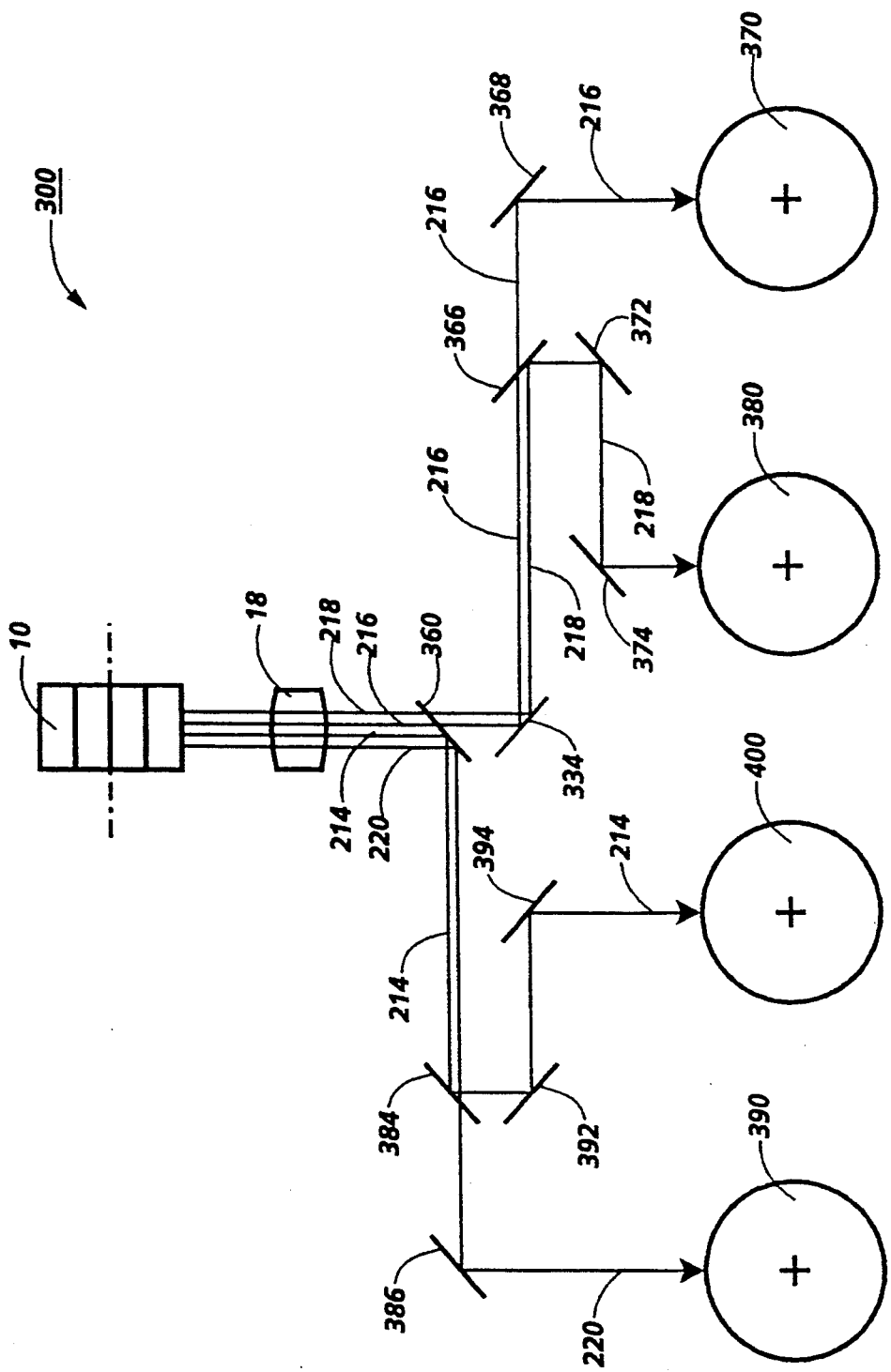
FIG. 7 shows a simplified schematic view of a four laser beam raster output scanner apparatus according to a fourth embodiment of the present invention.

FIG. 7 shows a simplified schematic view of a fourth embodiment apparatus 300 in which four laser beams are simultaneously scanned across four moving photoreceptors. Again, only the chief rays are shown. Apparatus 300 is a multiple station printer that uses the raster output scanner 2 (not all of whose components are shown in FIG. 7), including polygon 10 and optics 18, to simultaneously deflect four laser beams, designated laser beams 214, 216, 218, and 220, which are obtained from laser device 4 (shown in FIG. 1). The four laser beams in FIG. 7 are identical to the four laser beams described in conjunction with FIG. 5 and may thus be derived from the same laser source 4. However, in the embodiment shown in FIG. 7 a dichroic beam separator 360, having optical characteristics similar to those shown in FIG. 6, first separates laser beams 216 and 218 from laser beams 214 and 220. A polarized beam separator 366, having transmission characteristics as shown in FIG. 3, then separates the overlapping beams 216 and 218. Mirror 368 directs the separated laser beam 216 onto a photoreceptor 370, while mirrors 372 and 374 reflect separated laser beam 218 onto a photoreceptor 380. Similarly, a polarized beam separator 384, having transmission characteristics substantially similar to those of polarized beam separator 366, separates overlapping beams 214 and 220. A mirror 386 reflects the separated laser beam 220 onto a photoreceptor 390, while mirrors 392 and 394 reflect the separated laser beam 214 onto a photoreceptor 400. Since each laser beam is independently modulated with image information, distinct latent images are simultaneously impressed on each photoreceptor. Thus, the apparatus 300 is suitable for full color reproduction, wherein each laser beam produces a distinct latent image on its associated photoreceptor which corresponds to its associated system color, substantially as described in conjunction with the embodiment of FIG. 5.

The embodiments described above logically extend to architectures which use multiple laser beams in place of the described individual laser beams. Such architectures, while more complex, increase the achievable output by simultaneously writing multiple lines. For example, in the case of the four station systems shown in FIGS. 5 and 7, each single laser beam (such as beam 214) is replaced by multiple laser beams, beneficially from a laser diode array, having similar wavelengths and polarizations. Of course, the multiple beams which replace each single beam differ from the other multiple beams in either wavelength or polarization. Two laser diode arrays of N lasers each can be fabricated using staggered lasers grown on a grooved substrate as described in U.S. Pat. No. 4,786,918 to Thornton, et al., which is hereby incorporated by reference. Four arrays of N lasers each can be obtained by combining two of those staggered arrays. Alternately, four laser diode arrays of N lasers each can be obtained by use of the integrated package described in a concurrently filed U.S. Pat. application "RASTER OUTPUT SCANNER FOR A SINGLE PASS PRINTING SYSTEM WHICH SEPARATES PLURAL LASER BEAMS BY WAVELENGTH AND POLARIZATION," Ser. No. 07/948,530, filed Sep.22, 1992 by Appel et al.

The above described method and apparatus is particularly advantageous when combined with other sections of a xerographic printer. Such other sections include, for example, a photoreceptive belt or drum, means for moving the photoreceptor, means for charging the photoreceptor, means for forming a latent image on the photoreceptor, means for transferring the latent image to paper, means for erasing the latent image from the photoreceptor, means for cleaning the photoreceptor, paper transport means, and means for fusing the image onto the paper.

To those skilled in the arts to which this invention relates, many variations and modifications to the present invention will suggest themselves. Accordingly, it is intended that the present invention embrace all alternatives, modifications and variations that fall within the spirit and scope of the appended claims..

What is claimed:

1. A raster output scanner, comprising:
   means for producing coaxially overlapping, orthogonally polarized first and second laser beams on a first optical path;
   means for sweeping said coaxially overlapping, orthogonally polarized first and second laser beams onto a second optical path; and
   an optical polarized beam separator disposed on said second optical path, said optical polarized beam separator for directing said first laser beam onto a third optical path and for directing said second laser beam onto a fourth optical path.

2. The raster output scanner according to claim 1, wherein said first and second laser beams are from a substantially common spatial location.

3. The raster output scanner according to claim 2, further including first photoreceptor means for receiving said first laser beam and for creating a first image in response to said first laser beam.

4. The raster output scanner according to claim 3, further including means for directing said second laser beam onto said first photoreceptor, and for creating a second image in response to said second laser beam such that said first and said second images are on separate regions of said first photoreceptor.

5. The raster output scanner according to claim 4, wherein said directing means includes a means for equalizing the optical path lengths of said first and second laser beams.

6. The raster output scanner according to claim 5, wherein said equalizing means includes a mirror.

7. The raster output scanner according to claim 3, further including second photoreceptor means for receiving said second laser beam and for creating a second image in response to said second laser beam.

8. The raster output scanner according to claim 7, further including means for equalizing the optical path lengths of said first and second laser beams.

9. The raster output scanner according to claim 8, wherein said equalizing means includes a mirror.

10. A raster output scanner, comprising:
   means for producing overlapping and coaxial first, second and third laser beams, wherein said first and second laser beams have differing wavelengths but similar polarizations, and wherein said first and third laser beams have differing polarizations;
   means for directing said first, second, and third laser beams onto a first optical path;
   means for sweeping said first, second, and third laser beams along a second optical path;
   an optical polarized beam separator disposed on said second optical path, said optical polarized beam separator for directing said first and second laser beams onto a third optical path and for directing said third laser beam onto a fourth optical path; and
   a dichroic beam separator disposed on said third optical path, said dichroic beam separator for directing said first laser beam onto a fifth optical path and said second laser beam onto a sixth optical path.

11. The raster output scanner according to claim 10, wherein said first, second, and third laser beams are from a substantially common spatial location.

12. The raster output scanner according to claim 11, further including first photoreceptor means for receiving said first laser beam and for creating a first image in response to said first laser beam.

13. The raster output scanner according to claim 12, further including means for directing said second and third laser beams onto said first photoreceptor such that second and third images are created, and such that said first, second, and third images are created on separate regions of said first photoreceptor.

14. The raster output scanner according to claim 13, wherein said directing means includes a means for equalizing the optical path lengths of at least two of said first, second, and third laser beams.

15. The raster output scanner according to claim 14, wherein said equalizing means includes a mirror.

16. The raster output scanner according to claim 12, further including second and third photoreceptor means for receiving said second and third laser beam, respectively, and for creating second and third images in response so said received second and third laser beams.

17. The raster output scanner according to claim 16, further including means for equalizing the optical path lengths of at least two of said first, second, and third laser beams.

18. The raster output scanner according to claim 17, wherein said equalizing means includes a mirror.

19. A raster output scanner, comprising:
   means for producing overlapping and coaxial first, second and third laser beams, wherein said first and second laser beams have differing wavelengths but similar polarizations, and wherein said first and third laser beams have similar wavelengths but differing polarizations;
   means for directing said first, second, and third laser beams onto a first optical path;
   means for sweeping said first, second, and third laser beams along a second optical path;
   a dichroic beam separator disposed on said second optical path, said dichroic beam separator for directing said first and third laser beams onto a third optical path and for directing said second laser beam onto a fourth optical path; and
   an optical polarized beam separator disposed on said third optical path, said optical polarized beam separator for directing said first laser beam onto a fifth optical path and said third laser beam onto a sixth optical path.

20. The raster output scanner according to claim 19, wherein said first, second, and third laser beams are from a substantially common spatial location.

21. The raster output scanner according to claim 20, further including first photoreceptor means for receiving said first laser beam and for producing a first image in response to said first laser beam.

22. The raster output scanner according to claim 21, further including means for directing said second and third laser beams onto said first photoreceptor such that second and third images are created, and such that said first, second, and third images are created on separate regions of said first photoreceptor.

23. The raster output scanner according to claim 22, wherein said directing means includes a means for equalizing the optical path lengths of at least two of said first, second, and third laser beams.

24. The raster output scanner according to claim 23, wherein said equalizing means includes a mirror.

25. The raster output scanner according to claim 21, further including second and third photoreceptor means for receiving, respectively, said second and third laser beam such that second and third image are formed on said second and third photoreceptors.

26. The raster output scanner according to claim 25, further including means for equalizing the optical path lengths of at least two of said first, second, and third laser beams.

27. The raster output scanner according to claim 26, wherein said equalizing means includes a mirror.

28. A raster output scanner, comprising:
   means for producing overlapping and coaxial first, second, third, and fourth laser beams, wherein said first and second laser beams have differing wavelengths but similar polarizations, and wherein said third and fourth laser beams have differing wavelengths but similar polarizations, and wherein said polarizations of said first laser beam and said fourth laser beam differ;

means for directing said first, second, third, and fourth laser beams onto a first optical path;

means for sweeping said first, second, third and fourth laser beams along a second optical path;

an optical polarized beam separator disposed on said second optical path, said optical polarized beam separator for directing said first and second laser beams onto a third optical path and for directing said third and fourth laser beam onto a fourth optical path;

a first dichroic beam separator disposed on said third optical path, said first dichroic beam separator for directing said first laser beam onto a fifth optical path and said second laser beam onto a sixth optical path; and a second dichroic beam separator disposed on said fourth optical path, said second dichroic beam separator for directing said third laser beam onto a seventh optical path and for directing said fourth laser beam onto an eighth optical path.

29. The raster output scanner according to claim 28, wherein said first, second, third, and fourth laser beams are from a substantially common spatial location.

30. The raster output scanner according to claim 29, further including first photoreceptor means for receiving said first laser beam, and for creating a first image in response to said first laser beam.

31. The raster output scanner according to claim 30, further including means for directing said second, third, and fourth laser beams onto said first photoreceptor such that second, third, and fourth images, respectively, are created on separate regions of said first photoreceptor.

32. The raster output scanner according to claim 31, wherein said directing means includes means for equalizing the optical path lengths of at least two of said first, second, third, and fourth laser beams.

33. The raster output scanner according to claim 32, wherein said equalizing means includes a mirror.

34. The raster output scanner according to claim 30, further including second, third, and fourth photoreceptor means for receiving said second, third, and fourth laser beam, respectively, and for creating second, third, and fourth images in response to said second, third, and fourth laser beams.

35. The raster output scanner according to claim 34, further including means for equalizing the optical path lengths of at least two of said first, second, third, and fourth laser beams.

36. The raster output scanner according to claim 35, wherein said equalizing means includes a mirror.

37. A raster output scanner, comprising:

means for producing overlapping and coaxial first, second, third, and fourth laser beams, wherein said first and second laser beams have similar wavelengths but differing polarizations, and wherein said third and fourth laser beams have similar wavelengths but differing polarizations, and wherein said wavelengths of laser beams one and three differ;

means for directing said first, second, third, and fourth laser beams onto a first optical path;

means for sweeping said first, second, third and fourth laser beams along a second optical path;

a dichroic beam separator disposed on said second optical path, said dichroic beam separator for directing said first and second laser beams onto a third optical path and for directing said third and fourth laser beams onto a fourth optical path;

a first optical polarized beam separator disposed on said third optical path, said first optical polarized beam separator for directing said first laser beam onto a fifth optical path and for directing said second laser beam onto a sixth optical path; and a second optical polarized beam separator disposed on said fourth optical path, said second optical polarized beam separator for directing said third laser beam onto a seventh optical path and for directing said fourth laser beam onto an eighth optical path.

38. The raster output scanner according to claim 37, wherein said first, second, third, and fourth laser beams are from a substantially common spatial location.

39. The raster output scanner according to claim 38, further including first photoreceptor means for receiving said first laser beam, and for creating a first image in response to said first laser beam.

40. The raster output scanner according to claim 39, further including means for directing said second, third, and fourth laser beams onto said first photoreceptor such that said second, third, and fourth images, respectively, are created on separate regions of said first photoreceptor.

41. The raster output scanner according to claim 40, wherein said directing means includes means for equalizing the optical path lengths of at least two of said first, second, third, and fourth laser beams.

42. The raster output scanner according to claim 41, wherein said equalizing means includes a mirror.

43. The raster output scanner according to claim 39, further including second, third, and fourth photoreceptor means for receiving said second, third, and fourth laser beam, respectively, and for creating second, third, and fourth images in response to said second, third, and fourth laser beams.

44. The raster output scanner according to claim 43, further including means for equalizing the optical path lengths of at least two of said first, second, third, and fourth laser beams.

45. The raster output scanner according to claim 46, wherein said equalizing means includes a mirror.

46. A printer, comprising:

means for producing coaxially overlapping, orthogonally polarized first and second laser beams on a first optical path;

means for sweeping said coaxially overlapping, orthogonally polarized first and second laser beams onto a second optical path; and an optical polarized beam separator disposed on said second optical path, said optical polarized beam separator for directing said first laser beam onto a third optical path and for directing said second laser beam onto a fourth optical path.

47. The printer according to claim 46, wherein said first and second laser beams are from a substantially common spatial location.

48. The printer according to claim 47, further including first photoreceptor means for receiving said first laser beam and for creating a first image in response to said first laser beam.

49. The printer according to claim 48, further including means for directing said second laser beam onto said first photoreceptor, and for creating a second image in response to said second laser beam such that said first and said second images are on separate regions of said first photoreceptor.

50. The printer according to claim 49, wherein said directing means includes a means for equalizing the optical path lengths of said first and second laser beams.

51. The printer according to claim 50, wherein said equalizing means includes a mirror.

52. The printer according to claim 48, further including second photoreceptor means for receiving said second laser beam and for creating a second image in response to said second laser beam.

53. The printer according to claim 52, further including means for equalizing the optical path lengths of said first and second laser beams.

54. The printer according to claim 53, wherein said equalizing means includes a mirror.

55. A printer, comprising:
means for producing overlapping and coaxial first, second and third laser beams, wherein said first and second laser beams have differing wavelengths but similar polarizations, and wherein said first and third laser beams have differing polarizations;
means for directing said first, second, and third laser beams onto a first optical path;
means for sweeping said first, second, and third laser beams along a second optical path;
an optical polarized beam separator disposed on said second optical path, said optical polarized beam separator for directing said first and second laser beams onto a third optical path and for directing said third laser beam onto a fourth optical path; and
a dichroic beam separator disposed on said third optical path, said dichroic beam separator for directing said first laser beam onto a fifth optical path and said second laser beam onto a sixth optical path.

56. The printer according to claim 55, wherein said first, second, and third laser beams are from a substantially common spatial location.

57. The printer according to claim 56, further including first photoreceptor means for receiving said first laser beam and for creating a first image in response to said first laser beam.

58. The printer according to claim 57, further including means for directing said second and third laser beams onto said first photoreceptor such that second and third images are created, and such that said first, second, and third images are created on separate regions of said first photoreceptor.

59. The printer according to claim 58, wherein said directing means includes a means for equalizing the optical path lengths of at least two of said first, second, and third laser beams.

60. The printer according to claim 59, wherein said equalizing means includes a mirror.

61. The printer according to claim 57, further including second and third photoreceptor means for receiving said second and third laser beam, respectively, and for creating second and third images in response so said received second and third laser beams.

62. The printer according to claim 61, further including means for equalizing the optical path lengths of at least two of said first, second, and third laser beams.

63. The printer according to claim 62, wherein said equalizing means includes a mirror.

64. A printer, comprising:
means for producing overlapping and coaxial first, second and third laser beams, wherein said first and second laser beams have differing wavelengths but similar polarizations, and wherein said first and third laser beams have similar wavelengths but differing polarizations;
means for directing said first, second, and third laser beams onto a first optical path;
means for sweeping said first, second, and third laser beams along a second optical path;
a dichroic beam separator disposed on said second optical path, said dichroic beam separator for directing said first and third laser beams onto a third optical path and for directing said second laser beam onto a fourth optical path; and
an optical polarized beam separator disposed on said third optical path, said optical polarized beam separator for directing said first laser beam onto a fifth optical path and said third laser beam onto a sixth optical path.

65. The printer according to claim 64, wherein said first, second, and third laser beams are from a substantially common spatial location.

66. The printer according to claim 65, further including first photoreceptor means for receiving said first laser beam and for producing a first image in response to said first laser beam.

67. The printer according to claim 66, further including means for directing said second and third laser beams onto said first photoreceptor such that second and third images are created, and such that said first, second, and third images are created on separate regions of said first photoreceptor.

68. The printer according to claim 67, wherein said directing means includes a means for equalizing the optical path lengths of at least two of said first, second, and third laser beams.

69. The printer according to claim 68, wherein said equalizing means includes a mirror.

70. The printer according to claim 66, further including second and third photoreceptor means for receiving, respectively, said second and third laser beam such that second and third image are formed on said second and third photoreceptors.

71. The printer according to claim 70, further including means for equalizing the optical path lengths of at least two of said first, second, and third laser beams.

72. The printer according to claim 71, wherein said equalizing means includes a mirror.

73. A printer, comprising:
means for producing overlapping and coaxial first, second, third, and fourth laser beams, wherein said first and second laser beams have differing wavelengths but similar polarizations, and wherein said third and fourth laser beams have differing wavelengths but similar polarizations, and wherein said polarizations of said first laser beam and said fourth laser beam differ;
means for directing said first, second, third, and fourth laser beams onto a first optical path;
means for sweeping said first, second, third and fourth laser beams along a second optical path;
an optical polarized beam separator disposed on said second optical path, said optical polarized beam separator for directing said first and second laser beams onto a third optical path and for directing said third and fourth laser beam onto a fourth optical path;
a first dichroic beam separator disposed on said third optical path, said first dichroic beam separator for directing said first laser beam onto a fifth optical path and said second laser beam onto a sixth optical path; and a second dichroic beam separator disposed on said fourth optical path, said second dichroic beam separator for directing said third laser beam onto a seventh optical path and for directing said fourth laser beam onto an eighth optical path.

74. The printer according to claim 73, wherein said first, second, third, and fourth laser beams are from a substantially common spatial location.

75. The printer according to claim 74, further including first photoreceptor means for receiving said first laser beam, and for creating a first image in response to said first laser beam.

76. The printer according to claim 75, further including means for directing said second, third, and fourth laser beams onto said first photoreceptor such that second, third, and fourth images, respectively, are created on separate regions of said first photoreceptor.

77. The printer according to claim 76, wherein said directing means includes means for equalizing the optical path lengths of at least two of said first, second, third , and fourth laser beams.

78. The printer according to claim 77, wherein said equalizing means includes a mirror.

79. The printer according to claim 75, further including second, third, and fourth photoreceptor means for receiving said second, third, and fourth laser beam, respectively, and for creating second, third, and fourth images in response to said second, third, and fourth laser beams.

80. The printer according to claim 79, further including means for equalizing the optical path lengths of at least two of said first, second, third, and fourth laser beams.

81. The printer according to claim 80, wherein said equalizing means includes a mirror.

82. A printer, comprising:

means for producing overlapping and coaxial first, second, third, and fourth laser beams, wherein said first and second laser beams have similar wavelengths but differing polarizations, and wherein said third and fourth laser beams have similar wavelengths but differing polarizations, and wherein said wavelengths of laser beams one and three differ;

means for directing said first, second, third, and fourth laser beams onto a first optical path;

means for sweeping said first, second, third and fourth laser beams along a second optical path;

a dichroic beam separator disposed on said second optical path, said dichroic beam separator for directing said first and second laser beams onto a third optical path and for directing said third and fourth laser beams onto a fourth optical path;

a first optical polarized beam separator disposed on said third optical path, said first optical polarized beam separator for directing said first laser beam onto a fifth optical path and for directing said second laser beam onto a sixth optical path; and a second optical polarized beam separator disposed on said fourth optical path, said second optical polarized beam separator for directing said third laser beam onto a seventh optical path and for directing said fourth laser beam onto an eighth optical path.

83. The printer according to claim 82, wherein said first, second, third, and fourth laser beams are from a substantially common spatial location.

84. The printer according to claim 83, further including first photoreceptor means for receiving said first laser beam, and for creating a first image in response to said first laser beam.

85. The printer according to claim 84, further including means for directing said second, third, and fourth laser beams onto said first photoreceptor such that said second, third, and fourth images, respectively, are created on separate regions of said first photoreceptor.

86. The printer according to claim 85, wherein said directing means includes means for equalizing the optical path lengths of at least two of said first, second, third , and fourth laser beams.

87. The printer according to claim 86, wherein said equalizing means includes a mirror.

88. The printer according to claim 84, further including second, third, and fourth photoreceptor means for receiving said second, third, and fourth laser beam, respectively, and for creating second, third, and fourth images in response to said second, third, and fourth laser beams.

89. The printer according to claim 88, further including means for equalizing the optical path lengths of at least two of said first, second, third, and fourth laser beams.

90. The printer according to claim 46, wherein said equalizing means includes a mirror.

* * * * *